United States Patent [19]

Murakami et al.

[11] Patent Number: 5,019,546
[45] Date of Patent: May 28, 1991

[54] CATALYST FOR PURIFYING EXHAUST GAS AND METHOD OF MANUFACTURING THE SAME

[75] Inventors: Hiroshi Murakami, Hiroshima; Masayuki Koishi, Kure; Shoko Yatagai, Hiroshima; Kazuko Yamagata, Kure, all of Japan

[73] Assignee: Mazda Motor Corporation, Hiroshima, Japan

[21] Appl. No.: 475,770

[22] Filed: Feb. 5, 1990

[30] Foreign Application Priority Data

Feb. 16, 1989 [JP] Japan .................................. 1-37774

[51] Int. Cl.$^5$ ..................... B01J 21/04; B01J 21/06; B01J 23/10; B01J 23/40
[52] U.S. Cl. ................................ 502/303; 423/213.5
[58] Field of Search ............... 502/302, 303, 304, 333, 502/334, 339

[56] References Cited

U.S. PATENT DOCUMENTS

| | | | |
|---|---|---|---|
| 3,873,469 | 3/1975 | Foster et al. | 423/213.5 X |
| 4,492,769 | 1/1985 | Blanchard et al. | 502/303 X |
| 4,528,279 | 7/1985 | Suzuki et al. | 502/303 X |
| 4,678,770 | 7/1987 | Wan et al. | 423/213.5 X |
| 4,702,897 | 10/1987 | Onal | 423/213.5 |
| 4,760,044 | 7/1988 | Joy, III et al. | 502/303 |
| 4,791,091 | 12/1988 | Bricker et al. | 502/303 |
| 4,923,842 | 5/1990 | Summers | 502/303 X |
| 4,975,406 | 12/1990 | Frestad et al. | 502/334 X |

FOREIGN PATENT DOCUMENTS

| | | | |
|---|---|---|---|
| 63-077544 | 4/1988 | Japan | 502/303 |
| 63-104651 | 5/1988 | Japan | 502/303 |

OTHER PUBLICATIONS

Muraki, et al., "Palladium-Lanthanum Catalysts for Automotive Emission Control", Ind. Eng. Chem. Prod. Res. Dev. 1986, 25, 202-208.
Summers et al., "Interaction of Cerium Oxide with Noble Metals", Journal of Catalysis 58, 131-143 (1979).

*Primary Examiner*—William J. Shine
*Assistant Examiner*—Douglas J. McGinty
*Attorney, Agent, or Firm*—Wenderoth, Lind & Ponack

[57] ABSTRACT

A catalyst for purifying exhaust gas, comprising a catalyst carrier, a first coating layer formed on a surface of the catalyst carrier and mainly consisting of active alumina oxide containing platinum and rhodium and a second coating layer formed on a surface of the first coating layer and mainly consisting of palladium and composite powder including zirconium oxide and lanthanum oxide fixed on a surface of cerium oxide, and a method of manufacturing the catalyst.

13 Claims, 6 Drawing Sheets

CATALYST FOR PURIFYING EXHAUST GAS AND METHOD OF MANUFACTURING THE SAME

BACKGROUND OF THE INVENTION

The present invention generally relates to a motor vehicle and, more particularly, to a catalyst for purifying exhaust gas of the motor vehicle which has excellent heat resistance, and to a method of manufacturing the catalyst.

Recently, in response to higher output of an automotive engine and improvement of mileage or exhaust emission properties, there is a demand for higher heat resistance of a catalyst for purifying exhaust gas.

Thus, for example, Japanese Patent Publication No. 62-14338 published in 1987 proposes a catalyst for purifying exhaust gas, in which slurry formed by mixing at least one of cerium, zirconium, iron and nickel, at least one of neodymium, lanthanum and praseodymium and at least one of platinum, palladium and rhodium with active alumina is wash coated on the surface of a catalyst carrier.

However, the known catalyst has a drawback that since such catalyst elements as platinum and palladium are contained together on the catalyst carrier, both of the elements are alloyed by heat of exhaust gas, thereby resulting in deterioration of performance of the catalyst. Furthermore, in such catalyst, sintering of platinum takes place due to heat of exhaust gas, thus resulting in deterioration of performance of the catalyst.

Moreover, in such catalyst, since cerium has not only a function of improving purification performance of the catalyst but also the characteristic of deteriorating due to heat, zirconium having excellent heat resistance is contained in the catalyst in order to prevent this thermal deterioration of cerium.

However, since the cerium, zirconium and other elements are simply wash coated on the surface of the catalyst carrier in the form of a slurry mixture the atoms of zirconium are not in close enough relationship to the cerum atoms to sufficiently prevent thermal detrioration of cerium.

Therefore, such a catalyst has the disadvantage of low heat resistance because platinum, palladium and cerium are likely to deteriorate due to heat.

SUMMARY OF THE INVENTION

Accordingly, an essential object of the present invention is to improve heat resistance of a catalyst for purifying exhaust gas, by preventing thermal deterioration of platinum, palladium and cerium obtained thereon.

In order to accomplish this object of the present invention, the present invention is characterized in that platinum and palladium are, respectively, separately contained in two coating layers formed on the surface of a catalyst carrier. Also platinum and rhodium for preventing sintering of platinum are contained in an identical coating layer and zirconium and lanthanum having excellent heat resistance are fixed on the surface of cerium.

More specifically, a catalyst for purifying exhaust gas, according to the present invention comprises: a catalyst carrier; a first coating layer which is formed on a surface of said catalyst carrier and mainly consists of active alumina i.e. aluminum oxide, and containing platinum and rhodium; and a second coating layer which is formed on a surface of said first coating layer and mainly consists of palladium and composite powder including zirconium, particularly lanthanum oxide and lanthanum fixed on a surface of cerium particularly cerium oxide.

The method of manufacturing the catalyst, according to the present invention comprises the steps of: forming a first coating layer on a surface of a catalyst carrier; said first coating layer mainly consisting of active alumina containing platinum and rhodium; mixing solution of zirconium and solution of lanthanum with cerium so as to obtain a mixture; drying the mixture so as to obtain a solid matter; grinding the solid matter into composite powder in which zirconium and lanthanum are fixed on a surface of cerium; and forming a second coating layer on a surface of said first coating layer; said second coating layer mainly consisting of the composite powder and palladium.

In accordance with the present invention, since platinum and palladium are, respectively, contained in the first and second coating layers, platinum and palladium are separated each other. Therefore, even if platinum and palladium are set in a high-temperature state by heat of exhaust gas, platinum and palladium are not alloyed. Since rhodium is contained in the same first coating layer as platinum, sintering of platinum can be effectively prevented by rhodium.

In the catalyst of the present invention, zirconium and lanthanum are fixed on the surface of cerium, and zirconium and lanthanum are disposed close to cerium so as to prevent thermal deterioration of cerium.

Furthermore, in the manufacturing method of the present invention, after the solution of zirconium and the solution of lanthanum have been mixed with cerium so as to obtain the mixture, the mixture is dried so as to obtain the solid matter and the solid matter is ground. Consequently, the composite powder can be obtained in which zirconium and lanthanum are fixed on the surface of cerium.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
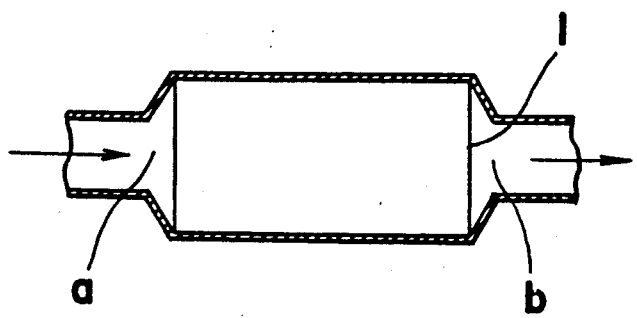
FIG. 1 is a schematic sectional view showing a catalyst for purifying exhaust gas, according to one embodiment of the present invention.
Figure 2:
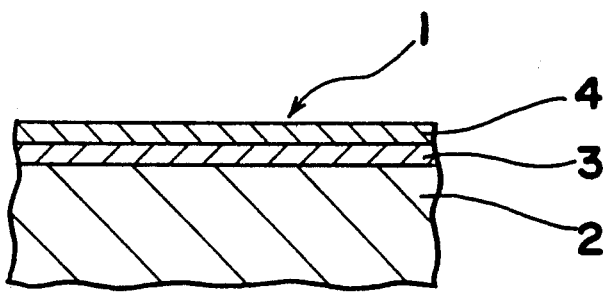
FIG. 2 is an enlarged fragmentary sectional view of the catalyst of FIG. 1.

Referring now to the drawings, there is shown in FIGS. 1 and 2, a catalyst 1 for purifying exhaust gas of a motor vehicle, according to one embodiment of the present invention. Exhaust gas is passed through the catalyst 1 from an inlet a in the direction of the arrow so as to be purified by the catalyst 1 and then, is discharged from an outlet b. The catalyst 1 includes a honeycomb structure 2 acting as a catalyst carrier, a first coating layer 3 formed on the surface of the honeycomb structure 2 and a second coating layer 4 formed on the surface of the first coating layer 3. The first coating layer 3 mainly consists of active alumina containing platinum (Pt) and rhodium (Rh). Meanwhile, the second coating layer 4 mainly consists of palladium (Pd) and composite powder in which zirconium (Zr) and lanthanum (La) are fixed on the surface of cerium (Ce).

In the catalyst 1, since platinum and palladium are, respectively, contained in the first and second coating layers 3 and 4 as described above, platinum and palladium are spaced away from each other. Thus, even if the catalyst 1 is exposed to high temperature, platinum and palladium are not alloyed, so that thermal deterioration of the catalyst 1 due to alloying of platinum and palladium is prevented.

Since rhodium and platinum are contained together in the first coating layer 3, atoms of rhodium having high heat resistance are disposed between atoms of platinum so as to prevent thermal deterioration of platinum due to its sintering. Hence, even if platinum is exposed to high-temperature exhaust gas, thermal deterioration of platinum does not take place readily.

Furthermore, since zirconium and lanthanum, which have high heat resistance, are fixed on the surface of cerium, zirconium and lanthanum are disposed close to cerium so as to prevent cerium from being heated to high temperature. Thus, cerium can effectively achieve an $O_2$ storage effect that cerium absorbs oxygen ($O_2$) in exhaust gas in a lean state of exhaust gas and emits absorbed oxygen in a rich state of exhaust gas so as to oxidize hydrocarbon and carbon monoxide (CO).

Hereinbelow, a method of manufacturing the catalyst 1 is described. Initially, 240 cc of water and 1 cc of nitric acid are mixed with 100 g of γ alumina acting as active alumina and 100 g of boehmite so as to obtain alumina slurry. After the honeycomb structure 2 has been dipped in this alumina slurry, the honeycomb structure 2 is pulled out of the alumina slurry. Excessive alumina slurry is removed from the honeycomb structure 2 by high-pressure air blow and thus, active alumina is wash coated on the surface of the honeycomb structure 2.

Subsequently, the honeycomb structure 2 having the alumina slurry adhering thereto is held at 130° C. for 1 hr. so as to be dried. Thereafter, the honeycomb structure 2 is held at 550° C. for 1.5 hr. so as to be calcined such that the first coating layer 3 is formed on the surface of the honeycomb structure 2. Subsequently, dinitrodiamineplatinum [$Pt(NO_2)_2(NH_3)_2$] and nitric rhodium are impregnated in the first coating layer 3 and then, the honeycomb structure 2 is held at 200° C. for 1 hr. so as to be dried. Thereafter, the honeycomb structure 2 is held at 600° C. for 2 hr. so as to be calcined.

Thus, the first coating layer mainly consisting of active alumina containing platinum and rhodium is formed on the surface of the honeycomb structure 2. The amount of the first coating layer 3 which is wash coated on the honeycomb structure 2 is about 7 wt. % of the honeycomb structure 2. A total amount of the precious metals impregnated in the honeycomb structure 2 is 1.6 g/l with the ratio of platinum to rhodium being 5:1.

Then a predetermined amount of solution of zirconium and a predetermined amount of solution of lanthanum are mixed with 120 g of cerium oxide ($CeO_2$) and 50 g of boehmite so as to obtain a mixture. Thus, the solutions of zirconium and lanthanum penetrate into powdery cerium oxide. Then, the mixture is dried so as to be set. Thus, a solid matter is obtained in which zirconium and lanthanum are fixed on the surface of cerium. Then, this solid matter is ground so as to obtain composite powder in which zirconium and lanthanum are fixed on the surface of cerium. Subsequently, 240 cc of water and 1.0 cc of nitric acid are added to and mixed with the above mentioned composite powder so as to obtain slurry of the composite powder. After the honeycomb structure 2 having the first coating layer 3 formed thereon has been dipped in the slurry of the composite powder, the honeycomb structure 2 is pulled out of the slurry of the composite powder and excessive slurry of the composite powder is removed from the honeycomb structure 2 by high-pressure air blow.

Subsequently, the honeycomb structure 2 having the slurry of the composite powder adhering thereto is held at 130° C. for 1 hr. so as to be dried. Thereafter, the honeycomb structure 2 is held at 550° C. for 1.5 hr. so as to be calcined. Thus, the second coating layer 4 mainly consisting of the composite powder in which zirconium and lanthanum are fixed on the surface of cerium is formed on the surface of the first coating layer 3. At this time, cerium, zirconium and lanthanum are present in the forms of their oxides, i.e. cerium oxide ($CeO_2$), zirconium oxide ($ZrO_2$) and lanthanum oxide ($La_2O_3$), respectively. The amount of the second coating layer 4 which is wash coated on the first coating layer is about 14 wt. % of the honeycomb structure 2. Respectively, cerium, zirconium and lanthanum comprises 14 wt. %, 5 wt. % and 5 wt. % of the second coating layer 4.

Next, the honeycomb structure 2 having the second coating layer 4 formed thereon is dipped in solution of palladium such that palladium is impregnated in by the second coating layer 4 at a rate of 1.0 g/l. Subsequently, the honeycomb structure 2 is held at 130° C. for 1 hr. so as to be dried and then, is held at 550° C. for 1.5 hr. so as to be calcined.

The above described manufacturing method may be replaced by the following method. Namely, after water, nitric acid and palladium have been added to and mixed with the composite powder referred to above so as to obtain slurry, the honeycomb structure 2 having the first coating layer 3 formed thereon is dipped in the slurry. Subsequently, the honeycomb structure 2 is dried and calcined such that the second coating layer 4 mainly consisting of the composite powder and palladium is formed on the surface of the first coating layer 3.

The amount of the precious metals contained in the honeycomb structure 2 are as follows. Namely, the approximate weight ratio of platinum to rhodium is desirably 5:1, as used conventionally. A total amount of platinum and rhodium needs to be not less than 1.0 g/l in view of performance for purifying exhaust gas and is preferably set at approximately 1.5 g/l. The amount of palladium needs to be not less than 0.5 g/l in view of performance for purifying exhaust gas and is preferably set at approximately 1.0 g/l.

Figure 3:
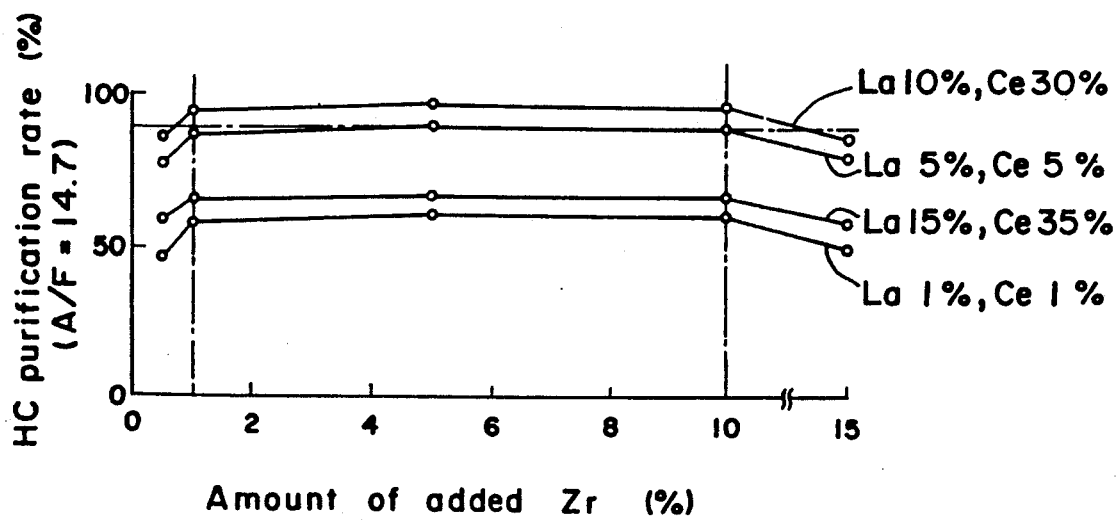
FIG. 3 is a graph showing relation between amount of addition of zirconium and purification rate of hydrocarbon by the catalyst of FIG. 1.

Hereinbelow, amounts of addition of zirconium, lanthanum and cerium in the second coating layer 4 are described with reference to FIGS. 3, 4 and 5, respectively. FIG. 3 shows relation between amount of addition of zirconium and purification rate of hydrocarbon at the time of air-fuel ratio of 14.7 in cases of addition of 10 wt. % of lanthanum and 30 wt. % of cerium, addition of 5 wt. % of lanthanum and 5 wt. % of cerium, addition of 15 wt. % of lanthanum and 35 wt. % of cerium and addition of 1 wt. % of lanthanum and 1 wt. % of cerium. In each of the above cases, purification performance drops when amount of addition of zirconium is less than 1 wt. % or exceeds 10 wt. %. When amount of addition of zirconium exceeds 10 wt. %, amount of zirconium is so large as to hamper functions of other components, thereby resulting in drop of purification rate. Therefore, amount of addition of zirconium preferably ranges from 1 to 10 wt. %.

Figure 4:
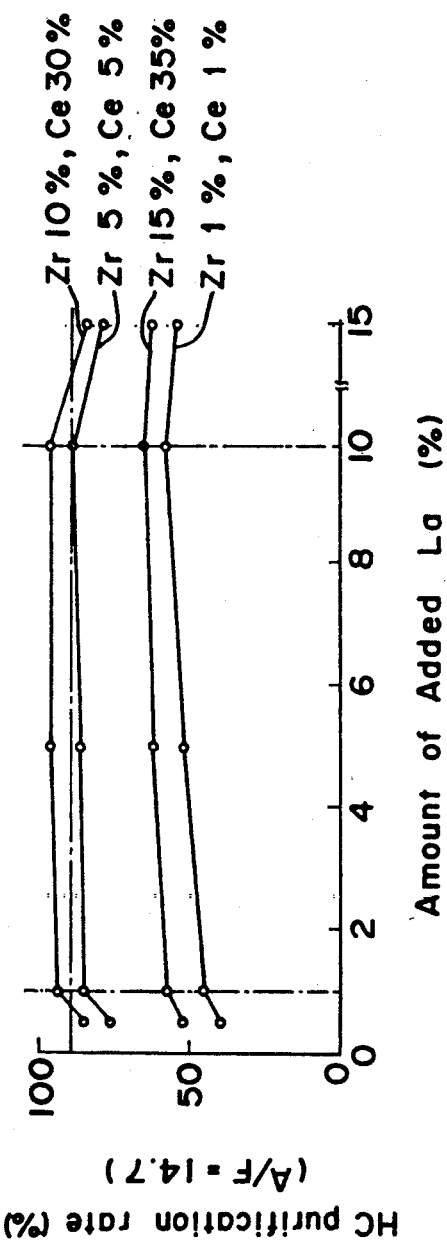
FIG. 4 is a graph showing relation between amount of addition of lanthanum and purification rate of hydrocarbon by the catalyst of FIG. 1.

FIG. 4 shows relation between amount of addition of lanthanum and purification rate of hydrocarbon at the time of air-fuel ratio of 14.7 in cases of addition of 10 wt. % of zirconium and 30 wt. % of cerium, addition of 5 wt. % of zirconium and 5 wt. % of cerium, addition of 15 wt. % of zirconium and 35 wt. % of cerium and addition of 1 wt. % of zirconium and 1 wt. % of cerium. In each of the above cases, purification performance drops when amount of addition of lanthanum is less than 1 wt. % or exceeds 10 wt. %. Thus, it is desirable that amount of addition of lanthanum ranges from 1 to 10 wt. %.

Figure 5:
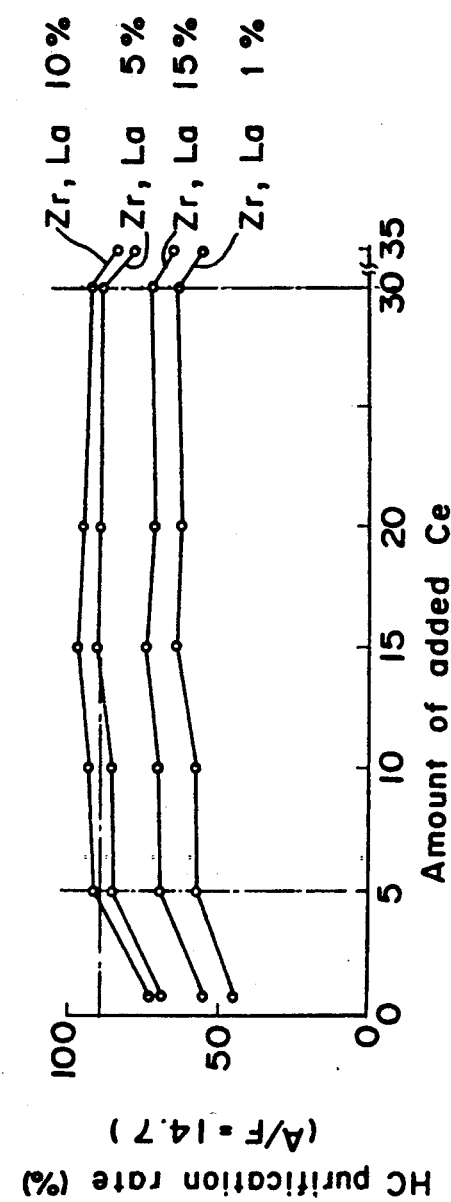
FIG. 5 is a graph showing relation between amount of addition of cerium and purification rate of hydrocarbon by the catalyst of FIG. 1.

FIG. 5 shows relation between amount of addition of cerium and purification rate of hydrocarbon at the time of air-fuel ratio of 14.7 in cases of addition of 10 wt. % of zirconium and 10 wt. % of lanthanum, addition of 5 wt. % of zirconium and 5 wt. % of lanthanum, addition of 15 wt. % of zirconium and 15 wt. % of lanthanum and addition of 1 wt. % of zirconium and 1 wt. % of lanthanum. In each of the above cases, purification performance drops when amount of addition of cerium is less than 5 wt. % or exceeds 30 wt. %. Hence, it is preferable that amount of addition of cerium ranges from 5 to 30 wt. %.

Before the description of purification performance of the catalyst 1 of the present invention proceeds, a conventional catalyst for purifying exhaust gas is described as a comparative example, hereinbelow. Initially, 240 cc of water and 1 cc of nitric acid are mixed with 100 g of γ alumina and 100 g of boehmite so as to obtain slurry. Then, zirconium, lanthanum and cerium in an amount leading to a total amount of their wash coating occupying 21 wt. % of the honeycomb structure are added to and agitated in the slurry so as to obtain alumina slurry. Subsequently, after the honeycomb structure has been dipped in the alumina slurry, the honeycomb structure is pulled out of the alumina slurry and excessive alumina slurry is removed from the honeycomb structure by high-pressure air blow. Thereafter, the honeycomb structure having the alumina slurry adhering thereto is held at 130° C. for 1 hr. so as to be dried and then, is held at 550° C. for 1.5 hr. so as to be calcined such that a coating layer is formed on the surface of the honeycomb structure. Furthermore, the honeycomb structure having the coating layer formed thereon is dipped in solutions containing predetermined concentrations of platinum, rhodium and palladium, respectively such that platinum, rhodium and palladium in amounts identical with those of the catalyst 1 of the present invention are impregnated in the coating layer. Subsequently, the honeycomb structure is held at 200° C. for 1 hr. so as to be dried and then, is held at 600° C. for 2 hr. so as to be calcined, whereby the conventional catalyst as a comparative example is obtained.

Figure 6:
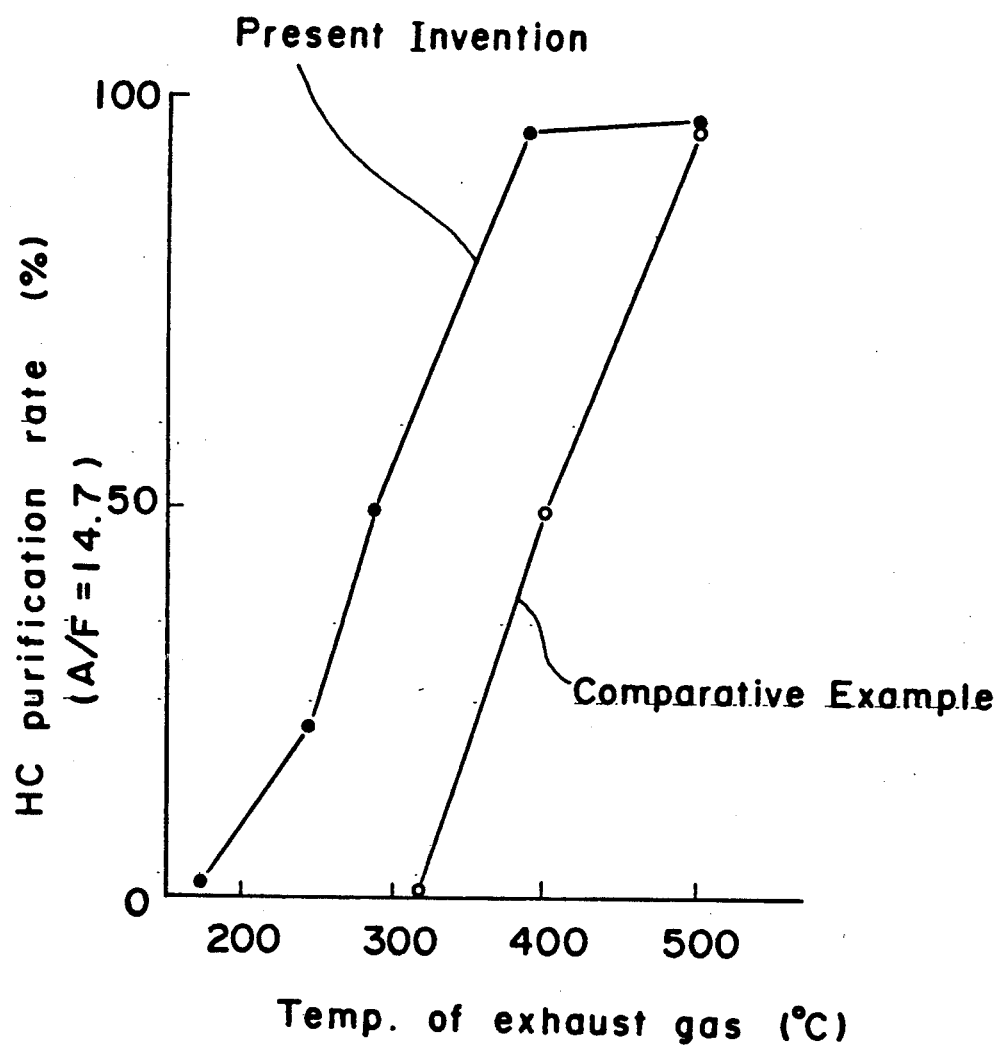
FIG. 6 is a graph showing purification performance of the catalyst of FIG. 1 and a comparative example.

FIG. 6 shows results of tests on purification performance of hydrocarbon by the catalyst 1 of the present invention and the above mentioned conventional catalyst. More specifically, FIG. 6 shows relation between temperature of exhaust gas and purification rate of hydrocarbon by the catalyst 1 of the present invention and the conventional catalyst as a comparative example. Before the tests, both of the catalyst 1 of the present invention and the conventional catalyst are heated in atmosphere at 900° C. for 50 hr. for aging so as to have a capacity of 24.0 cc. In the tests, air-fuel ratio is 14.7 and temperature of exhaust gas at the inlet a (FIG. 1) to the catalyst ranges from 100 to 500° C. at an air flow of 60,000 l/hr. FIG. 6 reveals that purification rate of the catalyst 1 of the present invention is far higher than that of the conventional catalyst, especially at low temperatures of exhaust gas. As is seen from FIG. 6, deterioration of the catalyst 1 of the present invention due to heat is lessened.

As is clear from the foregoing description, in the catalyst for purifying exhaust gas, according to the present invention, platinum and palladium are carried in the separate layers, respectively. Therefore, even if platinum and palladium are set in a high-temperature state, thermal deterioration of the catalyst due to alloying of platinum and palladium does not take place.

Rhodium and platinum are carried in the identical layer. Therefore, even if platinum is exposed to high temperature, rhodium prevents sintering of platinum and thus, deterioration of platinum due to its sintering does not take place.

Furthermore, since zirconium and lanthanum are fixed on the surface of cerium so as to be disposed close to cerium, thermal deterioration of cerium does not readily take place. Hence, even if the catalyst of the present invention is exposed to high-temperature exhaust gas, thermal deterioration of platinum, palladium and cerium does not readily occur and thus, the catalyst of the present invention has remarkably excellent heat resistance.

In the method of manufacturing the catalyst for purifying exhaust gas, according to the present invention, platinum and palladium are contained in the separate layers and rhodium and platinum are contained in the identical layer, while the composite powder in which zirconium and lanthanum are fixed on the surface of cerium is obtained. Accordingly, in the manufacturing method of the present invention, the catalyst of the present invention can be successfully manufactured.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as being included therein.

What is claimed is:

1. A catalyst for purifying exhaust gas, comprising:
a catalyst carrier;

a first coating layer which is formed on a surface of said catalyst carrier and mainly consists of active alumina containing platinum and rhodium; and a second coating layer which is formed on a surface of said first coating layer and mainly consists of palladium and a composite powder including oxides of zirconium and lanthanum fixed on a surface of cerium oxide.

2. A catalyst as claimed in claim 1, wherein said catalyst carrier is formed in a honeycomb structure.

3. A catalyst as claimed in claim 1, wherein said second coating layer contains 1 to 10 wt. % of zirconium.

4. A catalyst as claimed in claim 1, wherein said second coating layer contains 1 to 10 wt. % of lanthanum.

5. A catalyst as claimed in claim 1, wherein said second coating layer contains 5 to 30 wt. % of cerium.

6. A catalyst as claimed in claim 5, wherein said second coating layer contains 1 to 10 wt. % of zirconium and 1 to 10 wt. % of lanthanum.

7. A catalyst as claimed in claim 6, wherein said first coating layer contains not less than a total of 1.0 g/l of platinum and rhodium.

8. A catalyst as claimed in claim 6, wherein said second coating layer contains not less than 0.5 g/l of palladium.

9. A method of manufacturing a catalyst for purifying exhaust gas, comprising the steps of:
   forming a first coating layer on a surface of a catalyst carrier;
   said first coating layer mainly consisting of active alumina containing platinum and rhodium;
   mixing solution of zirconium and solution of lanthanum with cerium so as to obtain a mixture;
   drying the mixture so as to obtain a solid matter;
   grinding the solid matter into a composite powder comprising oxides of zirconium and lanthanum are fixed on a surface of cerium oxide; and
   forming a second coating layer on a surface of said first coating layer;
   said second coating layer mainly consisting of the composite powder and palladium.

10. A method as claimed in claim 9, wherein said catalyst carrier is formed in a honeycomb structure.

11. A method as claimed in claim 9, wherein said first coating layer is produced by the steps of:
    dipping said catalyst carrier in alumina slurry;
    removing said catalyst carrier from the alumina slurry;
    drying and calcining said catalyst carrier so as to form said first coating layer on the surface of said catalyst carrier;
    impregnating a platinum compound and a rhodium compound in said first coating layer; and
    drying and calcining said catalyst carrier.

12. A method as claimed in claim 9, wherein said second coating layer is produced by the steps of:
    preparing a slurry of the composite powder;
    dipping in the slurry said catalyst carrier having said first coating layer formed thereon;
    removing said catalyst carrier from the slurry;
    drying and calcining said catalyst carrier;
    dipping said catalyst carrier in solution of palladium;
    removing said catalyst carrier from the solution of palladium; and
    drying and calcining said catalyst carrier.

13. A method as claimed in claim 9, wherein said second coating layer is produced by the steps of:
    preparing a slurry of the composite powder mixed with palladium compound;
    dipping in the slurry said catalyst carrier having said first coating layer formed thereon;
    removing said catalyst carrier from the slurry; and
    drying and calcining said catalyst carrier.

* * * * *